US012700398B2

(12) United States Patent
Kamiyama et al.

(10) Patent No.: US 12,700,398 B2
(45) Date of Patent: Aug. 4, 2026

(54) LEARNING METHOD, LEARNING SYSTEM AND LEARNING PROGRAM

(71) Applicant: NTT, Inc., Tokyo (JP)

(72) Inventors: Hosana Kamiyama, Tokyo (JP); Yoshikazu Yamaguchi, Tokyo (JP)

(73) Assignee: NTT, Inc., Tokyo (JP)

( * ) Notice: Subject to any disclaimer, the term of this patent is extended or adjusted under 35 U.S.C. 154(b) by 452 days.

(21) Appl. No.: 18/272,246

(22) PCT Filed: Jan. 15, 2021

(86) PCT No.: PCT/JP2021/001354
§ 371 (c)(1),
(2) Date: Jul. 13, 2023

(87) PCT Pub. No.: WO2022/153504
PCT Pub. Date: Jul. 21, 2022

(65) Prior Publication Data
US 2024/0078999 A1 Mar. 7, 2024

(51) Int. Cl.
*G10L 15/00* (2013.01)
*G10L 15/06* (2013.01)
*G10L 15/16* (2006.01)
*G10L 19/00* (2013.01)
*G10L 25/30* (2013.01)

(52) U.S. Cl.
CPC ........... *G10L 15/063* (2013.01); *G10L 15/16* (2013.01); *G10L 19/00* (2013.01); *G10L 25/30* (2013.01)

(58) Field of Classification Search
CPC ..... G10L 15/02; G10L 21/0208; G10L 25/78; G10L 19/005; G10L 19/00; G10L 15/16; G10L 25/27; G10L 25/30; G10L 15/12; G10L 15/063; G10L 19/02; G10L 19/0204; G10L 19/035; G10L 15/07; G10L 15/20; G10L 15/22; G10L 15/26; G10L 15/30
See application file for complete search history.

(56) References Cited

U.S. PATENT DOCUMENTS

| | | | | |
|---|---|---|---|---|
| 5,461,696 A | * | 10/1995 | Frank | G06N 3/08 |
| | | | | 706/22 |
| 10,339,958 B2 | * | 7/2019 | Braskich | G10L 25/51 |
| 10,403,269 B2 | * | 9/2019 | Sainath | G06N 3/045 |
| 10,621,378 B1 | * | 4/2020 | Kim | G06N 3/04 |

FOREIGN PATENT DOCUMENTS

| | | |
|---|---|---|
| JP | 2011248001 A | 12/2011 |
| JP | 202139293 A | 3/2021 |

OTHER PUBLICATIONS

Sainath et al. (2013) "Deep Convolutional Neural Networksfor LVCSR" IEEE International Conference on Acoustics, Speech and Signal Processing, May 26, 2013.

* cited by examiner

*Primary Examiner* — Vu B Hang

(57) ABSTRACT

A learning method includes the following processes. A shuffling process acquires learning data arranged in a time series and rearranges the learning data in an order different from the order of the time series. A learning process trains an acoustic model using the learning data rearranged through the shuffling process.

20 Claims, 6 Drawing Sheets

Fig. 2

<sub>11</sub>

| DATA NUMBER i | TIME t | FEATURE AMOUNT DATA xi(t) | STATE NUMBER OF PHONEME yi(t) |
|---|---|---|---|
| 1 | 0 | [0.0, 0.2, ···, 0.8] | 0 |
|  | 1 | [0.0, 0.2, ···, 0.1] | 0 |
|  | 2 | [1.0, 0.1, ···, 0.3] | 243 |
|  | 3 | [0.9, 0.8, ···, 0.5] | 243 |
|  | ··· | ··· | ··· |
|  | Ti−1 | [0.2, 0.2, ···, 0.8] | 0 |
| 2 | 0 | [0.0, 0.2, ···, 0.8] | 0 |
|  | 1 | [0.0. 0.2, ···, 0.1] | 0 |
|  | 2 | [1.0, 0.1, ···, 0.3] | 54 |
|  | 3 | [0.9, 0.8, ···, 0.5] | 54 |
|  | ··· | ··· | ··· |
|  | Ti−1 | [0.2, 0.2. ···, 0.8] | 0 |
| ⋮ | ⋮ | ⋮ | ⋮ |
| I |  |  |  |

Fig. 3

$\varsigma$14

| DATA NUMBER j | FEATURE AMOUNT DATA x(j) | STATE NUMBER OF PHONEME y(t)j |
|---|---|---|
| 1 | [0.001, 0.202, ···,0.801]<br>[0.002, 0.102, ···,0.009]<br>[1.003, 0.099, ···,0.301]<br>[0.902, 0.799, ···,0.500]<br>···<br>[0.200, 0.201, ···,0.798] | 54 |
| 2 | $\lvert X(j) \rvert$ | 243 |
| ⋮ | ⋮ | ⋮ |
| J | | |

LEARNING METHOD, LEARNING SYSTEM AND LEARNING PROGRAM

CROSS-REFERENCE TO RELATED APPLICATIONS

This application is a U.S. National Stage Application filed under 35 U.S.C. § 371 claiming priority to International Patent Application No. PCT/JP2021/001354, filed on 15 Jan. 2021, the disclosure of which is hereby incorporated herein by reference in its entirety.

TECHNICAL FIELD

The present invention relates to a learning method, a learning system, and a learning program.

BACKGROUND ART

In recent years, speech recognition for converting voice information into characters has been used in contact centers, conference recording systems, etc. in companies. Speech recognition is considerably widely used, methods for providing speech recognition are provided in various forms, and speech recognition services are also provided in a form that anyone can use in cloud-type services or the like.

In order to realize speech recognition, it is generally necessary to train an acoustic model and a language model in accordance with an application situation in which speech recognition is used. The acoustic model is a model for associating features of vocal sound with phoneme information. In recent years, the accuracy of speech recognition has been improved by training the acoustic model using a deep neural network (DNN) (refer to NPL 1).

In training of the acoustic model, a pair of a feature amount sequence and a phoneme sequence of speech in an application situation is prepared and a relationship between a feature amount and the kind of a phoneme is trained for each frame. Although neural networks in various structures can be used for a DNN used for training a speech model, the most basic model is a network using a fully coupled layer or a convolutional neural network. In a network using a fully coupled layer or a convolutional neural network, several frames before and after a certain frame are input, and phonemes of the frames are determined. As several frames before and after a certain frame, for example, five frames before and after the frame, 11 frames in total, or the like are used.

CITATION LIST

Non Patent Literature

[NPL 1] Tara N. Sainath, Abdel-rahman Mohamed, Brian Kingsbury, Bhuvana Ramabhadran, "DEEP CONVO-LUTIONAL NEURAL NETWORKS FOR LVCSR," 2013 IEEE International Conference on Acoustics, Speech and Signal Processing, 26-31 May 2013

SUMMARY OF INVENTION

Technical Problem

However, in order to perform learning in accordance with a application situation, learning of the relationship between a feature amount sequence and a phoneme sequence in an acoustic model is necessary, but the feature amount sequence and the phoneme sequence often include confidential information and personal information in the application situation. In the following, personal information is also collectively called confidential information. In the case of considering a use form in a cloud type service or the like, uploading a feature amount sequence and a phoneme string including confidential information to a cloud system has a risk of information leakage.

For example, in learning data used in training of a conventional acoustic model, the feature amount of a voice is arranged in the original time series, and if the learning data flows out, speech recognition is performed using the feature amount, and thus confidential information included in the feature amount may be restored. Further, since state numbers of phonemes are also arranged in the original time series, the state numbers can be converted into phoneme strings, and thus confidential information may be restored.

The present invention has been made in view of the above-mentioned problems, and an object thereof is to improve the safety of model training for speech recognition.

Solution to Problem

In order to solve the above problem and accomplish the object, a shuffling process of acquiring learning data arranged in a time series and rearranging the learning data in an order different from an order of the time series, and a learning process of training an acoustic model using the learning data rearranged through the shuffling process are included.

Advantageous Effects of Invention

According to the present invention, it is possible to improve the safety of model training for speech recognition.

BRIEF DESCRIPTION OF DRAWINGS

FIG. 2 is a diagram showing an example of a learning database.

FIG. 3 is a diagram showing an example of a shuffled learning database.

DESCRIPTION OF EMBODIMENTS

An embodiment of a learning method, a learning system, and a learning program disclosed in the present application will be described in detail below with reference to the drawings. Note that the learning method, the learning system, and the learning program disclosed in the present application are not limited to the following embodiments.

First Embodiment

Learning System

Figure 1:
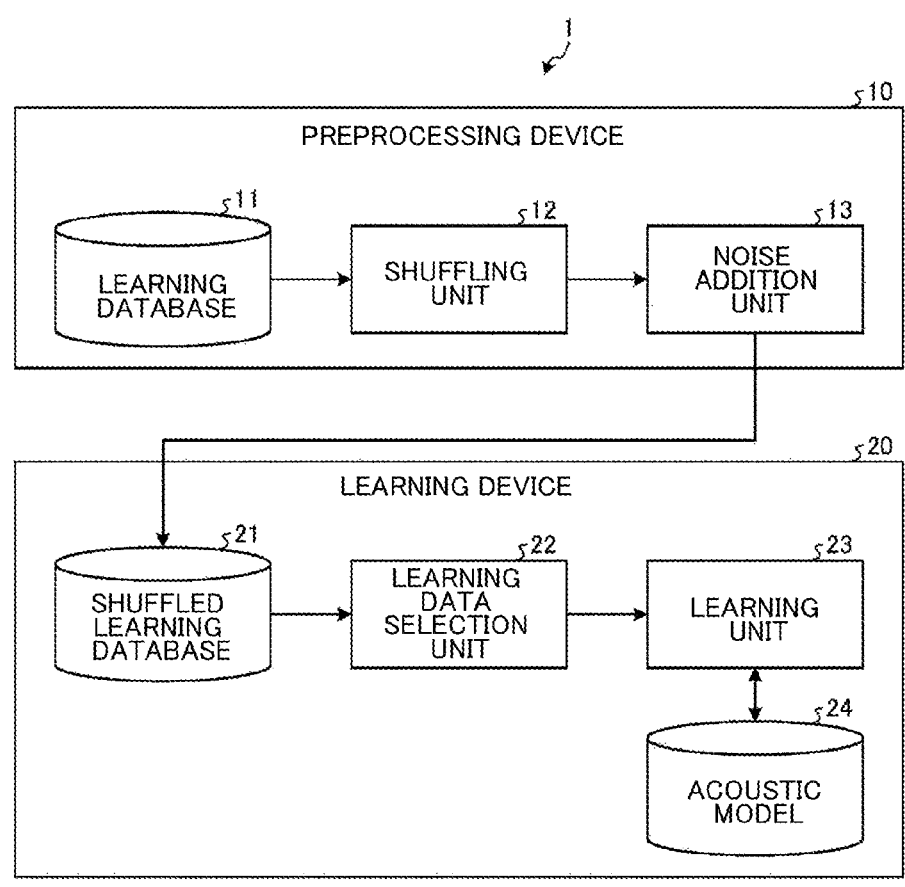
FIG. 1 is a block diagram of a learning system according to a first embodiment.

FIG. 1 is a block diagram of a learning system according to a first embodiment. As shown in FIG. 1, the learning system 1 according to the present embodiment includes a preprocessing device 10 and a learning device 20. The preprocessing device 10 and the learning device 20 are connected via, for example, a network such as the Internet. The learning device 20 is, for example, a computer for providing an acoustic recognition service provided in a cloud. The preprocessing device 10 is a computer of a user who uses the acoustic recognition service provided by the learning device 20, provides learning data to the learning device 20, causes the learning device 20 to create a trained acoustic model 24, and uses the acoustic recognition service by using the created trained acoustic model 24. Although the preprocessing device 10 can handle confidential information, it is preferable that the learning device 20 perform processing in a state in which confidential information is concealed.

Preprocessing Device

The preprocessing device 10 will be described. The preprocessing device 10 includes a learning database 11, a shuffling unit 12, and a noise addition unit 13, as shown in FIG. 1.

The learning database 11 is a database for holding learning data for performing machine learning on the acoustic model 24. FIG. 2 is a diagram showing an example of the learning database.

As shown in FIG. 2, the learning database 11 according to the present embodiment has I audio files each having a length of a time length Ti. In addition, a feature amount xi(t) and a state number yi(t) of a phoneme are registered for each audio file at a time t (t=0, 1, 2, . . . , Ti-1) in the learning database 11. A state number of a phoneme corresponds to an example of a phoneme label.

Description will continue by referring back to FIG. 1. The shuffling unit 12 assigns a new data number j, which is not related to a data number and time and is uniquely determined, to a feature amount and a phoneme number registered in the learning database 11. Accordingly, the shuffling unit 12 changes the arrangement order of learning data from the order registered in the learning database 11. That is, the shuffling unit 12 acquires learning data arranged in time series and rearranges the learning data in an order different from the order of the time series.

For example, the shuffling unit 12 reconfigures the database by assigning a new data number to a feature amount and a phoneme number as follows. More specifically, the shuffling unit 12 determines a feature amount X(j) and a state number Y(j) of a phoneme with respect to the new data number j, as represented by the following formula (1).

[Math. 1]

$$\begin{cases} \left\{ X(j) = \begin{pmatrix} x_i(t-L), x_i(t-L+1), \cdots, x_i(t-1,)x_i(t), \\ x_i(t+1), \cdots, x_i(t+L-1), x_i(t+L) \end{pmatrix} \right. \\ Y(j) = y(t) \end{cases} \quad (1)$$

L is an integer of 0 or more and is a parameter indicating a time length around the corresponding time used to determine a phoneme at the corresponding time. For example, the shuffling unit 12 assigns a value such as L=5. Here, when the t−L in formula (1) is smaller than 0, the shuffling unit 12 assumes that xi(t−L)=0 or xi(t−L)=xi(0). Further, when t+L is Ti or more, the shuffling unit 12 assumes that xi(t+L)=0 or xi(t+L)=, xi(Ti−1).

The shuffling unit 12 determines feature amounts X(j) and state numbers Y(j) of phonemes for learning data of all data numbers i (1, 2, . . . , I) registered in the learning database 11 using formula (1). At that time, the shuffling unit 12 repeats determination of the feature amounts X(j) and the state numbers Y(j) of phonemes using formula (1) with respect to all times t (0, 1, 2, . . . T) for each of pieces of learning data corresponding to a data number i. In this case, for each time t, the shuffling unit 12 generates a new database by uniquely and randomly allocating a new data number j to a feature amount X around the time t and a state number of a phoneme at the time t in the learning database 11. Thereafter, the shuffling unit 12 outputs the generated new database to the noise addition unit 13.

The noise addition unit 13 receives input of a new database in which learning data having new data numbers j is registered from the shuffling unit 12. The noise addition unit 13 adds minute noise having an information amount of such an extent that data cannot be rearranged and restored to each feature amount registered in the acquired new database. Accordingly, the noise addition unit 13 makes it impossible for data to be restored as binary data even when information on each time t and the feature amount therearound is used. Specifically, the noise addition unit 13 adds minute noise to a feature amount using the following formula (2).

[Math. 2]

$$X(j) \leftarrow X(j) + \varepsilon |X(j)| \quad (2)$$

Here, ε represents minute noise, and |X(j)| is the absolute value of a feature amount X(j). For example, ε is represented by the following formula (3) using σ which represents a minute value.

[Math. 3]

$$\varepsilon \sim N(\varepsilon | 0, \sigma) \quad (3)$$

Here, N(ε|0, σ) represents a normal distribution with a mean of 0 and a variance of σ. σ can be set based on a variation width in the same phoneme of speech The noise addition unit 13 repeats loading of noise on the feature amount X using formula (2) for the learning data of all data numbers j. In this manner, the noise addition unit 13 adds noise to feature amounts to such an extent that the data cannot be rearranged and restored, thereby making it difficult to obtain feature amounts having completely matching binary information by using a time corresponding to learning data corresponding to a data number j and a feature amount around the time. This makes it difficult to restore the original data. The noise addition unit 13 transmits the database in which noise has been added to registered feature amounts to the learning device 20 and stores it as a shuffled learning database 21.

Learning Device

Next, the learning device 20 will be described. As shown in FIG. 2, the learning device 20 includes a shuffled learning database 21, a learning data selection unit 22, a learning unit 23, and an acoustic model 24.

FIG. 3 is a diagram showing an example of the shuffled learning database. In the shuffled learning database 21, as learning data having new data numbers j determined by the shuffling unit 12, data in which noise has been added to a feature amount around a time t corresponding to the learning data and a state number of a phoneme at the time t are registered.

The learning data selection unit 22 randomly selects a data number j. Then, the learning data selection unit 22 acquires learning data of the data number j from learning data held by the shuffled learning database 21. Then, the learning data selection unit 22 outputs the acquired learning data to the learning unit 23. The learning data selection unit 22 repeats selection of learning data from the shuffled learning database 21 and output to the learning unit 23 until learning of the learning unit 23 is completed.

The learning unit 23 receives input of learning data from the learning data selection unit 22. The learning unit 23 trains the acoustic model 24 using feature amounts X(j) and state numbers Y(j) of phonemes included in the acquired learning data. The learning unit 23 can train the acoustic model 16 by general learning.

For example, when learning based on the Cross Entropy standard is performed, the learning unit 23 converts a state number Y(j) into an OneHot vector and updates parameters of the acoustic model 24 on the basis of a loss function represented by the following formula (4).

[Math. 4]

$$\text{Loss} = -\sum_{c=0}^{c} Y(j)_c \log p(Y(j) \mid X(j), \lambda)_c \quad (4)$$

Here, $\lambda$ represents the acoustic model 24. Further, $Y(j)_c$ is a c-th element when Y(j) has been converted into an OneHot vector. In addition, $P(Y(j) \mid X(j), \lambda)_c$ indicates the probability of the feature quantity X(j) being Y(j).

The learning unit 23 acquires learning data from the learning data selection unit 22 until update of the acoustic model 24 converges and repeats training of the acoustic model 24 using the acquired learning data. That is, the learning unit 23 trains the acoustic model 24 using learning data rearranged by the shuffling unit 12. Thereafter, the learning unit 23 ends training of the acoustic model 24 when update of the acoustic model 24 converges.

As the acoustic model 24, a fully coupled layer or a convolutional neural network (CNN) can be used. The trained acoustic model 24 is used for a speech recognition service on a cloud or the like.

Processing Procedure of Learning Processing

Figure 4:
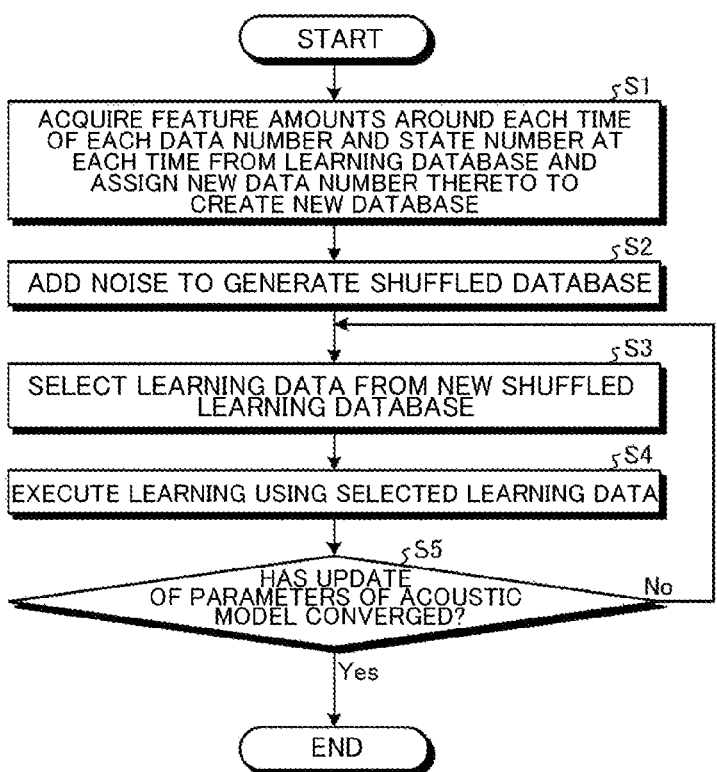
FIG. 4 is a flowchart of acoustic model training processing performed by the learning system according to the first embodiment.

Next, a flow of training processing of the acoustic model 24 performed by the learning system 1 according to the present embodiment will be described with reference to FIG. 4. FIG. 4 is a flowchart of acoustic model training processing performed by the learning system according to the first embodiment.

The shuffling unit 12 randomly selects a data number from the learning database 11 and randomly determines a time in learning data having the selected data number. Next, the shuffling unit 12 acquires a feature amount around the determined time of the learning data having the selected data number and a state number at the time. Then, the shuffling unit 12 assigns a new data number j, which is not related to the data number and the time and is uniquely determined, to the acquired feature amount and phoneme number. By repeating the above processing, the shuffling unit 12 acquires, from the learning database 11, feature amounts around each time of each data number and a state number at each time and assigns a new data number thereto to generate a new database (step S1).

The noise addition unit 13 receives input of the new database in which the order of learning data is shuffled from the shuffling unit 12. Next, the noise addition unit 13 adds minute noise to each feature amount registered in the acquired new database to generate a shuffled learning database 21 (step S2).

The learning data selection unit 22 randomly selects a data number. Then, the learning data selection unit 22 acquires learning data corresponding to the selected data number from the learning data held by the shuffled learning database 21 (step S3).

The learning unit 23 receives input of learning data from the learning data selection unit 22. Then, the learning unit 23 executes training of the acoustic model 24 using feature amounts X(j) and state numbers Y(j) of phonemes included in the acquired learning data (step S4).

Thereafter, the learning unit 23 determines whether or not update of the acoustic model 24 has converged (step S5). If update of the acoustic model 24 has not converged (NO in step S5), training processing of the acoustic model 24 is returned to step S3.

On the other hand, if update of the acoustic model 24 has converged (YES in step S5), the learning unit 23 ends training processing of the acoustic model 24.

In this manner, acoustic model training processing performed by the learning system 1 according to the present embodiment includes a shuffling process of acquiring learning data arranged in a time series and rearranging the learning data in an order different from the order of the time series, and a learning process of training the acoustic model 24 using the learning data rearranged through the shuffling process.

In the shuffling process, learning data having feature amounts and phoneme labels are acquired, new learning data is generated by combining feature amounts in a certain period around a specific time and a phoneme label at the specific time, and the new learning data is arranged in an order different from a time series order. Further, the learning process performs training of the acoustic model 24 using the new learning data.

Effects of Learning Processing According to First Embodiment

As described above, the learning device according to the present embodiment randomly selects a data number and a time from a database of learning data in which data numbers are added in a time series order and feature amounts and state numbers of phonemes are arranged in a time series order, arranges feature amounts around a selected time in learning data corresponding to the data number and a state number of a phoneme at that time, and assigns a new data number to the learning data to create a new database. Further, the learning device creates a shuffled learning database by adding noise to each of feature amounts included in each pieces of learning data of the new database. Then, the learning device performs training of the acoustic model by using the shuffled learning database.

Accordingly, time-series information is eliminated by changing the order of learning data, and it is difficult to achieve binary coincidence due to minute noise to make it difficult to restore confidential information. That is, even if confidential information is included in learning data at the time of training a speech model, an acoustic feature amount sequence and a phoneme sequence are converted into a state in which the confidential information cannot be restored, and thus training of an acoustic model can be performed. In this manner, it is possible to learn an acoustic model while curbing a risk related to information leakage using information in which confidential information cannot be restored. Therefore, the safety of model training for speech recognition can be improved.

Second Embodiment

Figure 5:
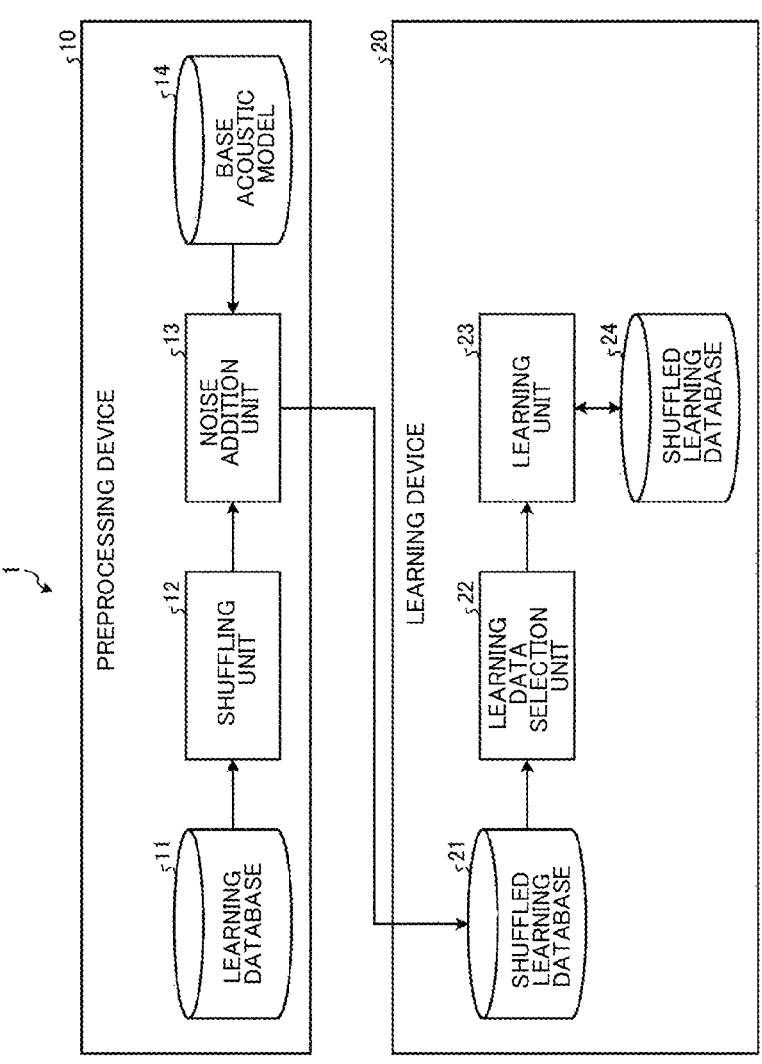
FIG. 5 is a block diagram of a learning system according to a second embodiment.

FIG. 5 is a block diagram of a learning system according to a second embodiment. The preprocessing device 10 of the learning system 1 according to the present embodiment differs from the first embodiment in that noise generated from an acoustic model previously prepared is added. The preprocessing device 10 according to the present embodiment includes a base acoustic model 14 in addition to the respective units of the first embodiment. In the following, description of the function of each unit identical to that of the first embodiment will be omitted.

Learning System

The base acoustic model 14 is an acoustic model which has been separately trained in advance. The base acoustic model 14 can be generated by causing the learning selection unit 15 and the learning unit 23 to learn other pieces of learning data.

The noise addition unit 13 performs noise addition in consideration of fluctuation of speech in feature amounts using the base acoustic model 14. Specifically, the noise addition unit 13 adds noise to feature amounts using the following formula (5) with respect to all learning data to which data numbers j have been assigned.

[Math. 5]

$$X(j) \leftarrow X(j) - \varepsilon\left(\frac{d}{dX}\mathrm{Loss}(X(j), Y(j), \theta)\right) \quad (5)$$

Here, ε represents minute noise having a positive value, and the function in the parenthesis of ε is a value obtained by differentiating the loss function Lose by X and inputting θ corresponding to X(j), Y(j), and θ corresponding to the base acoustic model 14. The function in the parenthesis of ε is a function which differentiates the loss function by elements of each feature amount, in which the loss function increases in a positive case and decreases in a negative case. Increase in the loss function means diverging from a model considering fluctuation in speech, and decrease in the loss function means approaching the model considering fluctuation in speech.

The noise addition unit 13 adds noise to feature amounts in a direction in which the loss function decreases in formula (5). Accordingly, the noise addition unit 13 can add noise in a direction of not deviating from fluctuation in speech.

In this manner, training processing of the acoustic model 24 performed by the learning system 1 according to the second embodiment further includes noise addition process of generating minute noise having an information amount by which learning data cannot be restored to a state in which the learning data is arranged in a time series even if the learning data is rearranged, and adding the minute noise to the learning data rearranged in the shuffling process. More specifically, the noise addition process generates noise which does not deviate from fluctuation in speech on the basis of the base acoustic model 14 created in advance.

Effects of Learning Processing According to Second Embodiment

As described above, the learning device according to the present embodiment adds noise to feature amounts such that the loss function decreases using an acoustic model prepared in advance. Accordingly, the learning device can add noise in a direction of not deviating from fluctuation in speech and reduce deterioration of the accuracy of speech recognition due to addition of noise. That is, it is possible to train an acoustic model in which a risk related to information leakage has been curbed while curbing deterioration in accuracy of speech recognition by adding fluctuation which is likely to be present in speech as noise. Therefore, it is possible to maintain the accuracy of speech recognition and to realize improvement of the safety of model training for speech recognition.

System Configuration and the Like

Further, respective components of each of the illustrated devices are functionally conceptual ones, and are not necessarily physically configured as illustrated in the figures. That is, specific forms of the distribution and integration of the devices are not limited to the illustrated forms. All or some of the forms of the distribution and integration of the devices can be distributed or integrated functionally or physically in any unit in accordance with various loads, usage situations, or the like. In particular, it is also possible to constitute a single learning device by combining the preprocessing device 10 and the learning device 20. Further, all or arbitrary some of the processing functions performed by the devices may be implemented by a central processing unit (CPU) and a program analyzed and executed by the CPU, or may be implemented as hardware by wired logic.

In addition, in each type of processing described in each present embodiment, all or some processing described as being automatically performed can be manually performed. Alternatively, all or some processing described as being manually performed can be automatically performed by known methods. In addition, information including the processing procedure, control procedure, specific name, various data and parameters that are shown in the above documents and drawings may be arbitrarily changed unless otherwise described.

Program

In an embodiment, the preprocessing device 10 and the learning device 20 can be implemented by installing, in an intended computer, a display control program that executes the aforementioned information processing as package software or online software. For example, it is possible to cause an information processing device to serve as the preprocessing device 10 or the learning device 20 by causing the information processing device to execute the display control program. An information processing device as used here includes desktop and laptop personal computers. Alternatively, the scope of the information processing devices further includes mobile communication terminals such as smart phone, mobile telephone, and personal handy-phone system (PHS), and slate terminals such as a personal digital assistant (PDA).

Further, the preprocessing device 10 and the learning device 20 can also be implemented as a management server device for providing a client, which is a terminal device used by a user, with a service related to the above-mentioned management processing. For example, the management server device is implemented as a server device which receives the configuration input request and provides a management service for performing configuration input. In this case, the management server device may be implemented as a Web server, or may be implemented as a cloud for providing service related to the above-mentioned management processing by outsourcing.

Figure 6:
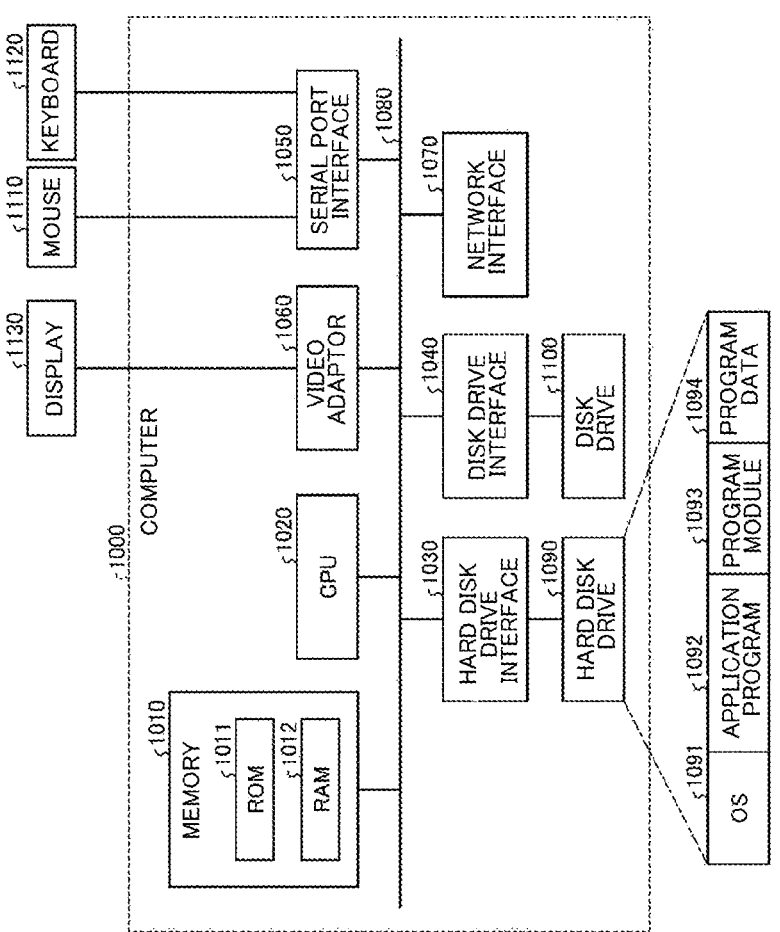
FIG. 6 is a diagram showing an example of a computer which executes a learning program.

FIG. 6 is a view showing an example of the computer which executes the learning program. A computer 1000 includes, e.g., a memory 1010 and a CPU 1020. Further, the computer 1000 also includes a hard disk drive interface 1030, a disk drive interface 1040, a serial port interface 1050, a video adapter 1060, and a network interface 1070. These units are connected to one another via a bus 1080.

The memory 1010 includes a read-only memory (ROM) 1011 and a random access memory (RAM) 1012. The ROM 1011 stores a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and a program data 1094. That is, a learning program that defines each type of processing of the preprocessing device 10 or the learning device 20 which has the same functions as those of the preprocessing device 10 or the learning device 20 is implemented as a program module 1093 on which computer-executable code is described. The program module 1093 is stored in, e.g., the hard disk drive 1090. For example, the program module 1093 for executing processing similar to the functional configuration of the preprocessing device 10 or the learning device 20 is stored in the hard disk drive 1090. Note that the hard disk drive 1090 may be replaced with a Solid State Drive (SSD).

In addition, setting data to be used in processing of the embodiments described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the processing of the above-described embodiment.

The program module 1093 and the program data 1094 are not limited to a case in which the program module 1093 and the program data 1094 are stored in the hard disk drive 1090 and, for example, may be stored in a removable storage medium and may be read by the CPU 1020 via the disk drive 1100 or the like. Alternatively, the program module 1093 and the program data 1094 may be stored in another computer connected via a network (such as Local Area Network (LAN) and Wide Area Network (WAN)). The program module 1093 and the program data 1094 may be read from another computer via the network interface 1070 by the CPU 1020.

REFERENCE SIGNS LIST

1 Learning system
10 Preprocessing device
11 Learning database
12 Shuffling unit
13 Noise addition unit
14 Base acoustic model
20 Learning device
21 Shuffled learning database
22 Learning data selection unit
23 Learning unit
24 Acoustic model

The invention claimed is:

1. A learning method comprising:
acquiring learning data in sequence based on a first sequence in a time series;
sequencing the learning data in a second sequence that is distinct from the first sequence in the time series;
generating noise data, wherein the noise data includes an amount by which the learning data is not able to be restored, in which the learning data is sequenced in the time series, by using information on each time in the time series and a feature amount including a minute noise;
adding the noise data to the learning data in the second sequence; and
training an acoustic model using the acquired learning data in the second sequence.

2. The learning method according to claim 1, wherein the acquiring further comprises:
acquiring the learning data including a feature amount and a phoneme label;
generating new learning data by combining the feature amount in a predetermined period around a predetermined time and the phoneme label at the predetermined time; and
sequencing the new learning data in the second sequence that is distinct from the first sequence in the time series, wherein the training further comprises training the acoustic model using the new learning data.

3. The learning method according to claim 1, further comprising:
generating noise data, wherein the noise data include an amount by which the learning data is not able to be restored to a state in which the learning data is sequenced in the time series even if the learning data is rearranged; and
adding the noise data to the learning data in the second sequence.

4. The learning method according to claim 3, wherein the generating the noise data further comprises generating the noise data based on a predetermined base acoustic model.

5. The learning method according to claim 3, wherein the generating noise data further comprises generating the noise data that prevents deviating from fluctuation in speech.

6. A learning system comprising a processor configured to execute operations comprising:
acquiring learning data in sequence based on a first sequence in a time series;
sequencing the learning data in a second sequence that is distinct from the first sequence in the time series;
generating noise data, wherein the noise data includes an amount by which the learning data is not able to be restored, in which the learning data is sequenced in the time series, by using information on each time in the time series and a feature amount including a minute noise;
adding the noise data to the learning data in the second sequence; and
training an acoustic model using the acquired learning data.

7. A computer-readable non-transitory recording medium storing computer-executable program instructions that when executed by a processor cause a computer system to execute operations comprising:

acquiring learning data in sequence based on a first sequence in a time series;

sequencing the learning data in a second sequence that is distinct from the first sequence in the time series;

generating noise data, wherein the noise data includes an amount by which the learning data is not able to be restored, in which the learning data is sequenced in the time series, by using information on each time in the time series and a feature amount including a minute noise;

adding the noise data to the learning data in the second sequence; and training an acoustic model using the acquired learning data.

8. The learning method according to claim 1, wherein the acquired learning data includes protected data according to the first sequence in the time series, and the training the acoustic model using the acquired learning data sequenced in the second sequence prevents exposing the protected data.

9. The learning method according to claim 2, further comprising:

generating noise data, wherein the noise data include amount by which the learning data is not able to be restored to a state in which the learning data is sequenced in the time series even if the learning data is rearranged; and adding the noise data to the learning data in the second sequence.

10. The learning method according to claim 4, wherein the generating noise data further comprises generating the noise data that prevents deviating from fluctuation in speech.

11. The learning system according to claim 6, wherein the acquiring further comprises:

acquiring the learning data including a feature amount and a phoneme label;

generating new learning data by combining the feature amount in a predetermined period around a predetermined time and the phoneme label at the predetermined time; and sequencing the new learning data in the second sequence that is distinct from the first sequence in the time series, wherein the training further comprises training the acoustic model using the new learning data.

12. The learning system according to claim 6, the processor further configured to execute operations comprising:

generating noise data, wherein the noise data include an amount by which the learning data is not able to be restored to a state in which the learning data is sequenced in the time series even if the learning data is rearranged; and adding the noise data to the learning data in the second sequence.

13. The learning system according to claim 6, wherein the acquired learning data includes protected data according to the first sequence in the time series, and the training the acoustic model using the acquired learning data sequenced in the second sequence prevents exposing the protected data.

14. The learning system according to claim 11, the processor further configured to execute operations comprising:

generating noise data, wherein the noise data include amount by which the learning data is not able to be restored to a state in which the learning data is sequenced in the time series even if the learning data is rearranged; and adding the noise data to the learning data in the second sequence.

15. The learning system according to claim 12, wherein the generating the noise data further comprises generating the noise data based on a predetermined base acoustic model.

16. The learning system according to claim 12, wherein the generating noise data further comprises generating the noise data that prevents deviating from fluctuation in speech.

17. The computer-readable non-transitory recording medium according to claim 7, wherein the acquiring further comprises:

acquiring the learning data including a feature amount and a phoneme label;

generating new learning data by combining the feature amount in a predetermined period around a predetermined time and the phoneme label at the predetermined time;

sequencing the new learning data in the second sequence that is distinct from the first sequence in the time series; and the training further comprises training the acoustic model using the new learning data.

18. The computer-readable non-transitory recording medium according to claim 7, the computer-executable program instructions when executed further causing the computer system to execute operations comprising:

generating noise data, wherein the noise data include an amount by which the learning data is not able to be restored to a state in which the learning data is sequenced in the time series even if the learning data is rearranged; and adding the noise data to the learning data in the second sequence.

19. The computer-readable non-transitory recording medium according to claim 7, wherein the acquired learning data includes protected data according to the first sequence in the time series, and the training the acoustic model using the acquired learning data sequenced in the second sequence prevents exposing the protected data.

20. The computer-readable non-transitory recording medium according to claim 18, wherein the generating the noise data further comprises generating the noise data based on a predetermined base acoustic model.

* * * * *